United States Patent [19]

Goulter

[11] Patent Number: 4,619,046
[45] Date of Patent: Oct. 28, 1986

[54] PINEAPPLE EYE EXTRACTOR

[76] Inventor: Victor H. Goulter, 485 Molimo Dr., San Francisco, Calif. 94127

[21] Appl. No.: 804,246

[22] Filed: Dec. 4, 1985

Related U.S. Application Data

[63] Continuation of Ser. No. 623,712, Jun. 22, 1984, abandoned.

[51] Int. Cl.$^4$ .............................................. B26B 13/00
[52] U.S. Cl. ..................................... 30/229; 30/113.2; 30/258; 30/279 R
[58] Field of Search ..................... 30/279 R, 229, 258, 30/113.2, 149, 178, 193, 278

[56] References Cited

U.S. PATENT DOCUMENTS

| | | | |
|---|---|---|---|
| 1,436,603 | 11/1922 | Philbert | 30/258 X |
| 1,812,350 | 6/1931 | Lingwood | 30/229 |
| 2,642,657 | 6/1953 | Arnt et al. | 30/229 |
| 2,874,465 | 2/1959 | Sillak | 30/258 X |

Primary Examiner—Douglas D. Watts
Attorney, Agent, or Firm—David Pressman

[57] ABSTRACT

A tool (15) with pivoted handles (18 and 19) for operating jaws (16 and 17) provides a means for removing unwanted "eyes" (7) from pineapples (6) when such handles are squeezed to close the jaws around and under an eye (7a). A spring (11) exerts opening pressure on handles so as to open the jaws after each use. An anvil blade (16) on one jaw cooperates with an open loop cutter blade (17) on the other jaw. In one preferred embodiment the jaws meet so as to sever the pineapple's fibers, while in another preferred embodiment, the anvil blade passes through the loop jaw so as to push the eyes out after cutting.

9 Claims, 6 Drawing Figures

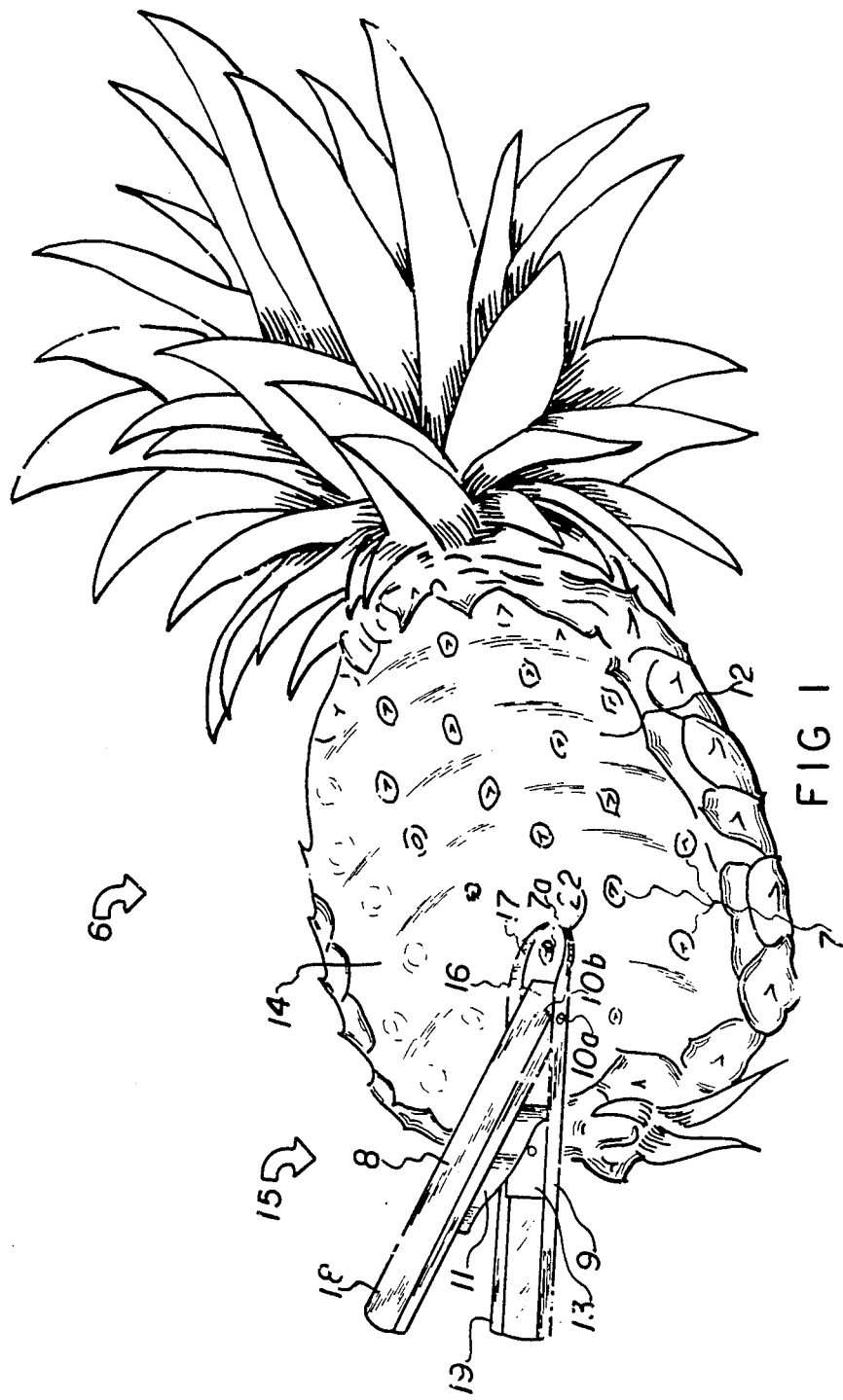

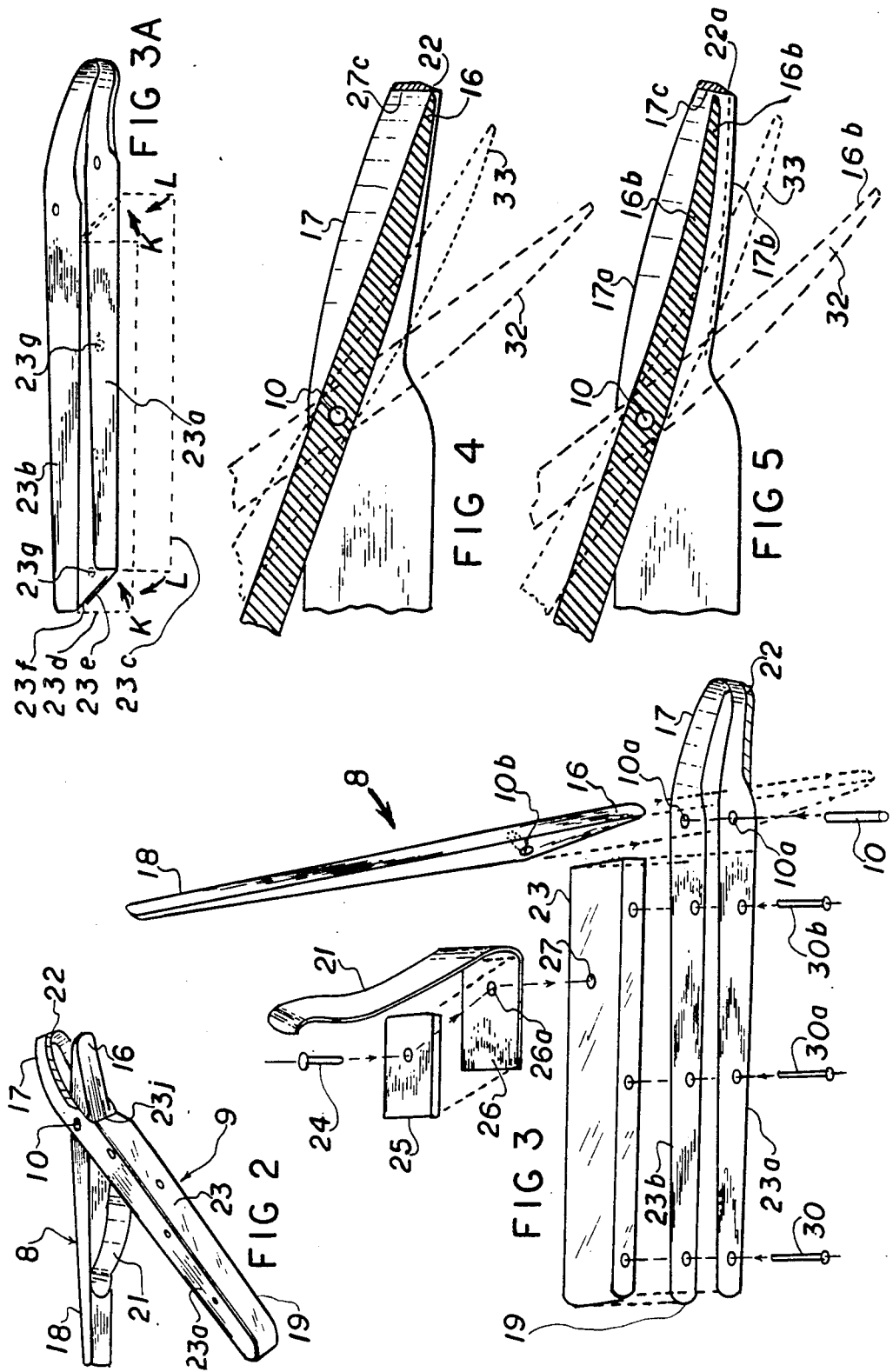

PINEAPPLE EYE EXTRACTOR

This application is a continuation of Ser. No. 623,712 filed 6/22/84 now abandoned.

BACKGROUND—FIELD OF INVENTION

The present invention relates to a tool used in the preparation of fruit for eating. In particular, it relates to a tool used to remove the "eyes" of produce, such as those which remain on pineapples after the skin is cut off.

BACKGROUND—DESCRIPTION OF PRIOR ART

In the past, pineapple skins had to be cut off so that they were very thick, sometimes up to 12 mm (½ in) thick in order to remove the pineapple's deep-set "eyes" (pips or fruitlets). This practice, unfortunately, not only also removes up to 25 percent of the edible part of the fruit, but some of its sweetest part. The skin could be cut to only half or a quarter of this depth, but then the remaining deep-set eyes had to be removed with the point of a knife, which is a slow and troublesome job.

Alternatively, the eyes could be left in, but one had to take care not to eat them. However this took away much of the pleasure of eating pineapples, and sometimes caused mouth injuries because of sharp edges on the eyes. Also, if one unintentionally chewed a hard, sharp-edged eye, he or she had an unnerving and unpleasant experience.

Some restaurants serve pineapples cut into slices by first quartering them lengthwise, then slicing them crosswise, so that the skins on the slices resemble the crusts on slices of bread. Patrons held the skin edges of the slice with their fingers and ate the fleshy fruit as near to the skin as possible. Because the skin was so hard and sharp, and the thought of touching it with their lips was unpleasant, most people refrained from eating too close, thereby wasting much of the fruit's sweet, edible part.

If a pineapple cost, say $1.90, it is resonable to calculate that at least 45 cents worth was thrown away and wasted when the skin was cut off in a slice. Whenever pineapple was used in fruit salad, extra care had to be taken to remove the eyes completely this is because it was not possible to see these eyes after the pineapple pieces were mixed with with other fruits, as well as creams, etc.

OBJECTS AND ADVANTAGES

Accordingly, one object and advantage of the present invention is to provide a means for removing the eyes in produce, including pineapples. Other objects and advantages are to make it unnessary to remove a thick layer of the pineapple's skin, to enable one to remove a pineapple's eyes cleanly and completely, to provide a quick-acting, east-to-use, eye-removal tool requiring no previous training, and to provide a means for preparing a very popular fruit for even greater enjoyment in eating. Further objects and advantages of my invention will become apparent from consideration of the drawings and ensuing description thereof.

BRIEF DESCRIPTION OF DRAWINGS

FIG. 1 is a perspective top view of the eye remover of the present invention in use on a pineapple.

FIG. 2 is a perspective bottom view of the eye remover.

FIG. 3 is a perspective exploded view of the eye remover.

FIG. 3A is a perspective view of an alternative handle configuration.

FIG. 4 is an enlarged, superimposed, sectional, side view of the cutting nose and pivot of the eye remover.

FIG. 5 is an enlarged, superimposed, sectional, side view of another preferred embodiment of the cutting nose and jaw of the eye remover.

Reference Numerals 6 pineapple
7 pineapple's eyes
7a pineapple eye
8 elongated member
9 other elongated member
10 pivot pin
10a pivot pin hole
10b other pivot pin hole
11 leaf spring
12 skin
13 tang (of leaf spring)
14 area (where eyes have been removed)
15 eye remover
16 anval blade
16b anvil blade (redesigned)
17 cutter jaw
17a cutter jaw (redesigned)
17b cutting edge (curved)
17c nose (redesigned)
18 handle
19 handle
20 rivet
22 cutter jaw sharpened edge
23 spacer part
23a side (of handle part)
23b side (of other handle part)
23c broken line
23d broken line
23e overlapping part
23f overlapping part
23g spot welding
23j end (of spacer part)
25 cover plate
26 hole (in leaf spring tang)
27 hole (in spacer part)
28 jaw end
32 broken line (cutting action of
33 broken line (cutting action of)

DETAILED DESCRIPTION OF ONE PREFERRED EMBODIMENT—FIG. 1

FIG. 1 shows a pineapple 6 with part of its skin 12 removed to show some of its eyes 7. In area 14, the eyes have already been removed. An eye remover 15 according to the present invention is shown in use. Remover 15 comprises a pair of hinged or pivoted elongated members 8 and 9 which form an "X". Member 8 comprises a handle part 18 on one side of a pivot hole 10b (hidden from view) and a flat anvil blade or jaw part 16 on the other side of 10b. Member 9 comprises a handle part 19 on one side of a pivot hole 10a and a U-shaped, loop-type, open cutter jaw 17. Jaw 17 has a sharpened edge 22 on its bight portion, remote from hole 10a.

In use anvil blade 16 is inserted under an eye 7a to be removed. Cutter jaw 17 will then be positioned above and around eye 7a.

Handles 18 and 19 of the eye remover are now closed as far as they will go, causing cutter jaw 17 to cut through the pineapple around the eye, against anvil blade 16, thereby to shear the eye out. Upon releasing hand pressure on the handles, a leaf spring 11 will reopen the jaws, making the tool ready to remove the next eye. The removed eye usually falls away, but if not, it will be pushed out by the next eye when it is removed from the pineapple.

An unskilled user of the remover can usually remove each eye in about one to one and one half seconds. Since a pineapple typically has about 125 eyes, all of its eyes can easily be removed in 2.0 to 3.1 min (125×1 to 1.5 seconds/eye×1 min/60 sec)

FIG. 2—Bottom View

FIG. 2 shows a bottom perspective view of the eye remover. Jaw 17 has a cutting edge 22 and is attached to support blade 16 by a pin 10. Leaf spring 11 is attached to spacer part 23.

FIG. 3—Exploded View

As shown in FIG. 3, spacer part 23 is fitted between sides 23a and 23b and secured to the sides by rivets 30, 30a, and 30b. Part 23 gives ridigity to handle 19 and also provides an anchor base for leaf spring 11. Spring 11 is secured to handle 19 by rivet pin 20 which passes through cover plate 25, leaf spring tang hole 26, and then through hole 27, in spacer part 23. Spacer 23 can be made of any material, preferably a suitable plastic.

Cover plate 25 can be made of aluminium or a suitable plastic or metal and can also be in the shape of a common washer. Its purpose is to give support to leaf spring base 13 and prevent it from bending or breaking at hole 26 where it is riveted to spacer part 23. Spacer part 23 is positioned so that its end 23j, as shown in FIG. 2, acts as a limit or stop for anvil blade 16 when jaws 16 and 17 are opened. Part 23 also positions the jaw opening at the best angle for inserting anvil blade 16 under the eye of the pineapple. FIG. 3 also shows open type cutter jaw 17 in detail and how anvil blade 16, with attached handle 18, is fitted with pivot pin 10, which passes through holes 10a and 10b.

FIG. 3A—Alternative Handle Part

FIG. 3A shows an alternative configuration which replaces parts 23, 23a, and 23b of FIG. 3. Sides 23a and 23b are made wider as shown by broken lines 23c and 23d. These extentions are then bent inward as shown by arrows K—K and L—L so that they overlap as shown at 23e and 23f. The overlapping plates are then spot welded together at 23g. The plates are made the same length as spacer part 23 and provide a stop and anchor base as described for FIG. 3.

FIG. 4—Jaw Operation

FIG. 4 shows the operation of cutter jaw 17 and anvil blade 16. The shearing and cutting actions of the two jaws are shown by broken lines 32 and 33. It will be realized that when fully closed, anvil blade 16 comes into contact with the inside of jaw end 28. This is advantagous in that it enables any fibers that may remain between the eye and the pineapple to be severed. Although the closed jaws will not move past each other to push the eye completely out of jaw 17, it may fall away of its own accord, or can easily be flicked away. In any case the eye will be pushed out by the next eye that is removed.

FIG. 5—Alternative Jaw Shape

FIG. 5 shows a different shape for cutter jaw 17 of FIG. 4. Here the jaw, designated 17a, has a curved cutting edge 17b and a straight nose 17c. Anvil blade 16b is also redesigned, i.e., it is curved so that it will follow through after passing nose 22a, thereby to push the eye completely out of cutter jaw 17a. Also the curved shape of anvil blade 16b enables it to be more easily inserted under the pineapple's eyes.

Although one of the carbon steels is preferred for the cutter jaw, it can satisfactorily be made of plastic. Ditto for support jaw 16 and handle 18. The materials used may effect the life of the tool, but in several tested versions, they do not adversly effect its effectiveness in removing eyes in pineapples.

Note that in the extractor or remover, the opening and the bight portion are generally parallel to an imaginary plane which parallel to the pivot axis (pin 7). The opening and bight portion move in a circle concentric to this pivot upon operation of the extractor; this circle is parallel to another imaginary plane which is (a) parallel to both elongated members 8 and 9 and (b) perpendicular to the axis of the pivot pin.

While the above description contains many specificities, these should not be construed as limitations on the scope of the invention, but rather as an exemplification of one preferred embodiment thereof. Many other variations are possible. For example, the tool can be used to remove eyes and imperfections of other fruit and produce such as potatoes. Also the anvil blade could be open in design, the cutter blade could be oval, square, non-parallel, and the parts could be shaped so that the eye remover could be held more vertically when removing the eyes of potatoes and like vegetables. Accordingly the scope of the invention should be determined not by the embodiment illustrated, but by the appended claims and their legal equivalents.

I claim:

1. An extractor for removing the eyes of fresh produce rapidly, comprising:

a pair of elongated members, one being a cutting member and the other being an anvil member, each of said members being pivotably attached to the other of said members at a location spaced from both ends of each member by a pivot, the part of each member on one side of said pivot comprising a jaw section, the other part of each member on the other side of said pivot comprising a handle section, the jaw section of said cutting member being U-shaped, the bight portion of said "U" being distal from said pivot and the legs of said "U" being connected to said pivot so as to form an opening, said "U" being formed of a flat, elongated strip of material having two major opposing surfaces of a relatively broad width and two relatively narrow edges joining said major surfaces, one of said major surfaces being the inside surface of said "U", said inside major surface of said strip having one portion which forms a surface of one leg of such "U" and which faces another portion of said inside major surface of said "U", the other portion of said inside major surface forming a surface of the other leg of said "U", the outer surface of said bight portion being the other of said two major surfaces of said strip of material, being free and constituting the end of said cutting member, one of said two edges of said bight portion being sharpened so as to form a U-shaped cutting edge, said cutting edge lying in a plane which is parallel to the axis of said pivot and oriented so that it moves in a circle concentric to said pivot when said cutting member is rotated with respect to the other of said members about said pivot, the jaw section of said anvil member being substantially straight so as to be easily insertable into an item of produce, being substantially flat at its end and having two opposed major surfaces at such end and two opposed minor surfaces interconnecting said major surfaces, one of said major surfaces of said end of said jaw section
(a) lying in a plane which is parallel to the axis of said pivot,
(b) facing said cutting edge of said bight portion, and
(c) having a sharpened end such that it can be inserted diagonally into the surface of a piece of produce and extend under an eye thereof, whereafter said eye will be positioned on said one major surface of said jaw section of said anvil member so that upon rotation of said two members together, said U-shaped cutting edge of said bight portion will meet said jaw section of said anvil member and sever said eye from said piece of produce.

2. The extractor of claim 1, further including means for urging said jaw sections of said members springably apart.

3. The extractor of claim 1 wherein said jaw section of said anvil member is smaller than said opening of said cutting member, such that said jaw section of said anvil member is able to pass through said opening of said cutting member.

4. The extractor of claim 1 wherein said jaw section of said anvil member comprises a substantially flat-bladed member having one surface which faces said opening of said cutting member's jaw section.

5. The extractor of claim 4 wherein said one surface of said anvil member which faces said cutting member has a concave curvature.

6. The extractor of claim 4 wherein said one surface of said anvil member which faces said cutting member is substantially flat.

7. The extractor of claim 1 wherein said cutting member is entirely comprised of an elongated flat member bent to have a U-shaped configuration, the bight portion and parts of the legs of said U-shaped member being on one side of said pivot and the other parts of the legs of said U-shaped member being on the other side of said pivot, said anvil member extending through said U-shaped member and being hingedly attached thereto by a pivot pin extending through the legs of said U-shaped member and said anvil member.

8. The extractor of claim 7 further including a filler piece mounted between the other parts of the legs of said U-shaped member.

9. The extractor of claim 8 wherein a leaf spring is attached to said filler piece and is shaped to open said jaw sections by spreading apart the handle sections of said members.

* * * * *